United States Patent Office 3,563,702
Patented Feb. 16, 1971

3,563,702
PRODUCTION OF CHLORINE DIOXIDE
Harold de Vere Partridge, Wilson, Blaine O. Schoepfle, Snyder, Arthur C. Schulz, North Tonawanda, and Herbert J. Rosen, Yonkers, N.Y., assignors to Hooker Chemical Corporation, Niagara Falls, N.Y., a corporation of New York
No Drawing. Filed Mar. 5, 1968, Ser. No. 710,648
Int. Cl. C01d 5/02; C01b 11/02, 7/02
U.S. Cl. 23—121                                   8 Claims

ABSTRACT OF THE DISCLOSURE

There is provided an improved process for the production of chlorine dioxide and chlorine wherein an alkali metal chlorate, chloride, and a strong acid are reacted in a single vessel in the presence of a relatively small amount of a catalyst selected from the group consisting of vanadium pentoxide, silver ions, manganese ions, dichromate ions, and arsenic ions.

This process, especially one of the preferred embodiments thereof wherein the acidity of the reaction mixture is maintained at below about 4 normal, is superior to and more efficient than prior art processes.

---

The present invention relates to a new, economical, very efficient process for generating chlorine dioxide.

Inasmuch as chlorine dioxide is of considerable commercial importance in the fields of pulp bleaching, water purification, fat bleaching, removal of phenols from industrial wastes, textile bleaching, and the like, it is very desirable to have a process by which it can be economically generated.

One of the means for generating chlorine dioxide is to react chlorate, chloride, and a strong acid. The reactions which occur are exemplified below fherein, for the sake of illustration, the chlorate used is sodium chlorate, the chloride used is sodium chloride, and the strong acid used is sulfuric acid.

(1) $NaClO_3 + NaCl + H_2SO_4 \rightarrow ClO_2 + \frac{1}{2}Cl_2 + NaSO_4 + H_2O$ (2) $NaClO_3 + 5NaCl + 3H_2SO_4 \rightarrow 3Cl_2 + 3Na_2SO_4 + 3H_2O$ This reaction can be and is used on a commercial scale, with the reactants continuously being fed into a reaction vessel and the chlorine and chloride dioxide produced continuously being removed from the reaction vessel.

Reaction 1, which is the desired one inasmuch as it produces chlorine dioxide, is favored by the use of about an equimolar amount of chlorate and chloride. When about equimolar amounts of said reactants are used, the process operates very efficiently, about 95 percent or more of the sodium chlorate added being converted to chlorine dioxide. However, when about equimolar amounts of these reactants are used, the reaction mixture must be maintained at high acidity (approximately ten normal when sulfuric acid is used) in order to cause nearly all the chlorate and chloride to react so as to minimize the loss of these reactants in the effluent solution. This, however, leads to the loss of about 3.2 pounds of sulfuric acid and 2.1 pounds of sodium sulfate in the effluent solution per pound of chlorine dioxide produced.

In situations in which the effluent acid and sodium sulphate can be recovered and used usefully, this process is very economical and is widely used. For example, in kraft pulp mills where chlorine dioxide is generated by this process for bleaching the plup, often the effluent acid is used for acidification of tall oil soap to produce tall oil. After separating of the tall oil the aqueous solution is introduced into the kraft mill chemical recovery system, thereby obtaining value for the sodium sulphate contained in the effluent solution.

In other situations where the acid value cannot be recovered in such a manner, the effluent solution may be introduced into the kraft mill chemical recovery system directly, in order to recover the value of the sodium sulphate. In some cases the acid also is valuable in helping to maintain the sulphide level in the cooking liquor. In other cases the acid is considered unnecessary and has little or no value.

Another way to recover full value from the effluent from the chlorine dioxide generator involves adding the aqueous solution of sodium chlorate and sodium chloride to the effluent liquor from a chlorine dioxide generator, plus some additional water, and cooling the mixture to approximately −15 degrees centigrade, in order to crystallize out Glauber's Salt (sodium sulphate decahydrate) in a separate crystallizing vessel in which the solution is cooled by a refrigeration unit and a heat exchanger. The crystals are separated, and the mother liquor, now containing chloric acid and hydrochloric acid, along with the excess sulphuric acid, is returned to the generator to produce more chlorine dioxide. All the water added to the system is removed by evaporation. This is accomplished by passing a stream of generator liquor through a separate evaporator unit to remove the added water and subsequently returning a concentrated stream to the generator.

It is an object of this invention to provide a simplified method for generating chlorine dioxide. Another object of this invention is to provide a method for effecting the generation of chlorine dioxide and the crystallization of the byproduct sulphate salt in a single reaction-crystallizer vessel. A further object of this invention is to provide more economical use of the chlorate and acid values used to effect the chlorine dioxide generation by recycling the mother liquor after salt removal, for further reaction. These and other objects will become apparent to those skilled in the art from the description which follows.

In accordance with this invention, there is provided a process for the production of chlorine dioxide and chlorine comprising reacting an alkali metal chlorate, chloride and a strong acid in a single vessel in the presence of a relatively small amount of a catalyst selected from the group consisting of vanadium pentoxide, silver ions, manganese ions, dichromate ions, and arsenic ions.

The present invention involves a simplified process for accomplishing the three steps of generating chlorine dioxide and chlorine, crystallizing out an alkali metal salt and evaporating the water from the system. What previously was performed in three separate vessels is now accomplished in a single vessel. By operating this single combined generator, crystallizer and evaporator under suitable vacuum, which is the preferred method of carrying out this invention, and by adding heat to the liquor, for example by means of a heat exchanger incorporated in the vessel, water is evaporated from the vessel to maintain the desired acidity and concentration while providing a secondary function of diluting the chlorine dioxide and thus minimizing the risk of reaching an explosive concentration of chlorine dioxide.

Table 1 illustrates the reaction conditions which may be used in applicants' process. Column (1) describes the preferred reaction condition, column (2) describes the more preferred reaction condition, and column (3) describes the most preferred reaction condition.

TABLE 1

| Reaction conditions | (1) | (2) | (3) |
|---|---|---|---|
| Temperature, degrees centigrade | −25–105 | 30–95 | 65–88 |
| Pressure, millimeters Hg, absolute | 50–760 | 100–400 | 150–250 |
| Chlorate ion molarity | (¹) | 0.5–2.5 | 1.0–2.0 |
| Chloride ion molarity | (¹) | 0.3–2.5 | 0.5–2.0 |
| Acid normality | 2–12 | 2.5–6 | 3–4 |

¹ 0.2 to saturation.

In applicants' process, to a generator-evaporator-crystallizer, hereinafter referred to as a "single vessel" is fed reaction solutions. A reaction solution, comprised of an alkali metal chlorate and a chloride, and a second solution, comprised of a strong acid, are fed to the generator wherein they are reacted. It is preferred, though not essential, to apply a vacuum to the liquid surface within the generator to remove reaction product and water; such vacuum may be applied, e.g., by a venturi eductor type vacuum means such as that produced by high pressure water, steam, or air. The product, chlorine dioxide and chlorine in admixture with water, may be further processed after it is removed from the system.

As the reaction occurs in said generator, crystals of sodium sulfate, bisulfate and/or sodium sulfate decahydrate are crystallized out and settle to the bottom of the generator from whence they are withdrawn as a slurry.

The slurry may be passed to an external crystal separator wherein the crystals are removed by such well-known means as centrifuging, filtering, or other solid liquid separation techniques. Wash water may be passed through the crystal separator to wash the removed crystals. The mother liquor from the crystals can be returned to the generator, as can the wash water.

While any type of equipment may be used to evacuate the single vessel, a water jet eductor may be advantageously used in which water serves to produce the necessary vacuum, condense the water vapor, and dissolve the chloride dioxide and chlorine produced.

Operation of the single vessel under vacuum and with the reaction solution at a temperature corresponding to its boiling point is not essential, however. Instead, the water required to be evaporated may be evaporated by passing a stream of inert gas, such as nitrogen, or air, e.g., at substantially atmospheric pressure through the reaction solution. This method, however, has the disadvantage of causing the chlorine dioxide to be heavily diluted with inert gas.

The chlorate and chloride, which may be sodium chlorate and sodium chloride, may be introduced into the generator-evaporator-crystallizer as an aqueous solution containing any desired ratio of the two reactants, or a separate solution of the two. The chloride to chlorate ratio influences the ratio of $ClO_2/Cl_2$ evolved. It is also possible to add these salts in dry form. In any case, these reactants are added continuously to the reaction vessel.

A separate stream of a strong acid, such as sulphuric acid, of any desired concentration, including concentrations above 100 percent, that is, solutions containing dissolved $SO_3$ in sulphuric acid, is also added continuously to the generator-evaporator-crystallizer vessel. The composition of the solution in the vessel may be varied over a wide range of acidity, chlorate concentration and chloride concentration, and may be maintained at different temperatures over a very wide range (see Table 1).

Sufficient water is evaporated from the reaction solution to form a super saturated solution with respect to the alkali metal salt of the strong acid thereby causing crystallization in the vessel of the alkali metal salt of the acid used in the process. The alkali metal salt is withdrawn from the vessel periodically or continuously, and the $ClO_2$ and $Cl_2$ evolved, together with water vapor and any inert gas introduced into the vessel are also withdrawn from the vessel.

It is not to be construed to mean that every possible combination of values from within the Table 1 operating ranges may be selected, as those skilled in the art will appreciate, but that for every value in any given range, there is a range of corresponding values which fall within the other broad ranges within which the process may be practiced.

One way of carrying out the process is as follows:

A chloride to chlorate ratio in the feed solutions is chosen to give the desired ratio of $ClO_2/Cl_2$. The molar ratio of chloride to chlorate in the feed solutions to the combination generator-evaporator-crystallizer may be varied over a wide range. From a practical point of view it generally will be between about 0.8:1 to 6:1 chloride to chlorate. Depending upon the activity of the reaction solution in the combination generator-evaporator-crystallizer and the temperature of the reaction solution, the use of feed solutions wherein the molar ratio of chloride to chlorate is close to 0.8:1 or 6:1 may lead to the precipitation of sodium chlorate or sodium chloride respectively, which will be recovered along with the alkali metal salt of the acid employed in process. This can be avoided by altering the composition of the feed solutions so that the molar ratio of chloride to chlorate is closer to the center of the range of 0.8:1 to 6:1. For the production of chlorine dioxide, the use of feed solutions having a molar ratio of the order of from 1.0:1 to 1.3:1 is preferred. The rates at which the chlorate, chloride and acid are fed to the vessel are then chosen to give the desired production rate of $ClO_2$, $Cl_2$ and alkali metal salt. Acidity and temperature are related to each other and are chosen so as to obtain the desired alkali salt and the desired production rate of this salt, $ClO_2$ and $Cl_2$. In this method of operation, the concentrations of chloride and chlorate in the reaction solution are dependent variables and, under steady state conditions, adjust themselves to the levels required by other vessel operating conditions.

An alternate method of operation is to first select the desired concentration of chlorate and chloride ions in the generating solution and then adjust the chlorate and chloride feeds as necessary to maintain said desired concentrations in the generating solution. This is perhaps a more fundamental type of process control since it is believed that the actual solution concentrations govern the yield and rate of chlorine dioxide production.

To adjust the contents of the generator-evaporator-crystallizer to the desired temperature, in the case where a vacuum is applied to the vessel, the degree of vacuum applied to the generator-evaporator-crystallizer is adjusted until the reaction solution will be at its boiling point when at the desired temperature, and the rate of heat input into the generator-evaporator-crystallizer is adjusted to raise the temperature of the reaction to the boiling point and to evaporate water at a rate sufficient to maintain a substantially constant volume of liquid in the generator-evaporator-crystallizer.

The evaporation of water at the aforementioned rate causes the formation of the desired crystalline product in the reaction solution in the generator-evaporator-crystallizer. The rate of total energy input into the system from all sources after steady state conditions have been reached is such that all of the water being added to the system and being formed by the reactions taking place therein, less any water of crystallization in any of the crystalline alkali metal salts recovered from the system, is evaporated from the reaction solution in the generator-evaporator-crystallizer and withdrawn as water vapor from the system. This rate of total energy input is related to the temperature chosen, the corresponding vacuum, the geometry of the system, the rate at which water is being added to the system after steady state conditions have been reached and the rate at which water is being removed as water of crystallization.

This process presupposes the return to the generator-evaporator-crystallizer of substantially all of the liquid effluent removed from the generator-evaporator-crystallizer and from which the solid crystalline phase is separated. If substantially all of this liquid effluent is not returned to the generator-evaporator-crystallizer, the rate at which water is required to be evaporated therein will be reduced by the rate at which it is being removed from the system. Operating the process in this latter manner generally will be undesirable because chlorate, chloride and sulphuric acid will be lost from the system, increasing the cost of operation. In some circumstances, however, for instance where sulphuric acid is required to make tall oil, it may be advantageous to remove some of the effluent from the system instead of recycling all of it.

In general, some of the reaction solution will leave the vessel along with the crystals. Recycle of this reaction solution to the vessel after removal of the crystals may be desirable from an economic point of view, if relatively large amounts of mother liquor are involved.

By choosing suitable conditions of temperature, acidity, and concentration of sodium chlorate or sodium chloride in the reacting solution, the solid phase which crystallizes out may be $NaHSO_4$, $NaHSO_4 \cdot H_2O$, $Na_3H(SO_4)_2$ or $Na_3H(SO_4)_2 \cdot H_2O$, $Na_2SO_4$, $Na_2SO_4 \cdot 10H_2O$, etc.

The crystals may be removed from the generator-evaporator-crystallizer as a slurry, separated from the liquor by filtration, by centrifuging or by other means, washed with water if desired and the liquor returned to the generator-evaporator-crystallizer.

Since no substantial amount of the liquid effluent from the combination generator-evaporator-crystallizer need be removed from the system, the concentration of acid, chlorate or chloride in the reacting solution may be varied over a wide range without substantial loss of these substances from the system.

It should be understood that chlorates and chlorides other than sodium chlorate and sodium chloride may be employed. Thus, potassium and lithium chlorates and chlorides may be used. Mixtures of these salts may be employed, if desired. Also it should be understood that phosphoric acid may be employed in place of sulphuric acid with the corresponding phosphate salts of the alkali metal chlorate and chloride employed being formed.

The reactions taking place in the generator are extremely complex and are influenced by many factors. In the generator there are sodium ions, chlorate ions, chloride ions, sulfate ions, hydrogen ions, water, chlorine dioxide, and chlorine. Additionally, there may be chloric, chlorous, and hypochlorous ions and, as is shown, e.g., by U.S. Pat. 2,936,219, there may be chlorite and hypochlorite ions. The concentration of these ions, the temperature of the reaction mixture, the relative rates of the many reactions going on, the acidity of the reaction mixture, the concentration of the catalyst present—all of these factors influence the system and the results obtainable therefrom.

In one of applicants' more preferred embodiments, the acidity of the system is maintained at less than 6 normal, preferably from about 3 to about 4 normal. It has been discovered that, in this embodiment, sodium sulfate is produced. The production of sodium sulfate rather than sodium bisulfate is extremely desirable inasmuch as a system which produces only the latter necessitates the use of a much greater amount of acid than a system which produces only the former.

When the aforementioned preferred embodiment is practiced, it is preferred that the temperature of the raction mixture be maintained at from about 65 to about 88 degrees centigrade, such as 85 degrees centigrade, although a reaction temperature of from about 70 to about 80 degrees centigrade is even more preferred. It is preferred that the system be maintained under a pressure of about 150 to about 250 millimeters of mercury, absolute, although it is more preferred that the pressure be from about 180 to about 220 millimeters of mercury absolute. It is preferred that the acid normality of the system be maintained at from about 3 to about 4, although it is even more preferred to maintain a normality of from about 3.4 to about 3.8. It is preferred to maintain the chloride ion molarity at from about 0.5 to about 2, the chlorate ion molarity at from about 1 to about 2, and the molar ratio of chloride/chlorate at from about 1 to 1.3.

Applicants' process is conducted in the presence of a catalyst selected from the group consisting of silver ions, manganese ions, dichromate ions, arsenic ions, and vanadium pentoxide.

Silver ion is the most preferred catalyst. From about 0.0001 to about 1.5 grams of silver ion per liter of reaction solution should be used. Although more than about 1.5 grams of silver ion may be used, one does not obtain significant increased efficiency with the excess amount of said ion.

Manganous ion is one of the preferred catalyst. From about 0.001 to about 4 grams of manganous ion per liter of reaction solution should be used; again, although one may use more than 4 grams of manganous iron per liter of reaction solution, one does not obtain any significant increased efficiency due to the use of the excess amount of said ion.

Dichromate ion, especially in the form of alkali metal dichromate such as sodium and potassium dichromate, is another one of the preferred catalysts. It should be used at concentrations of from about 0.5 to about 25 grams per liter, it again being understood that one can use more than 25 grams per liter if so desired.

Arsenic ion and vanadium pentoxide are also preferred catalysts. They, when used, should be in a concentration of from about 0.5 to about 25 grams per liter.

Applicants have discovered that, rather unexpectedly, when they practice the aforementioned preferred embodiment of their invention several very beneficial results accrue. In the first place, inasmuch as sodium sulfate is crystallized out from the system (instead of the sodium bisulfate), they require much less strong acid. Thus, e.g., when sulfuric acid is used as the strong acid they require approximately sixty percent less of this reagent. In the second place, they can run their system at a much lower concentration of chlorate, working at concentrations which are much lower than the saturation point. Inasmuch as the concentration of chlorate in the system affects the rate of chlorine dioxide production, the rate of Reaction 1, supra, being dependent upon said concentration, prior art processes have worked at or near the saturation point of chlorate, thereby creating the possibility that the whole reaction mixture may solidify. Applicants are able to avoid this danger by working at the lower chlorate concentration.

The aforementioned results are rather surprising. As has been indicated hereinbefore, even without a catalyst the aforementioned reaction mixture is very complex, being affected by many factors. When a catalyst is introduced into the mixture an infinitely more complex system is created, for now there is one additional component present which affects the reaction rates of some or all of the competing reactions taking place. Sodium sulfate crystallization, even in a system wherein relatively few components are present, is a very complex phenomenon which may not be predicted, e.g., merely on the basis of phase diagrams. When sodium and sulfate ions are thrown into applicants' extraordinarily complex system it becomes impossible to predict whether sodium chlorate, sodium bisulfate, sodium sulfate decahydrate, sodium sulfate any and/or all of these, or none of these will precipitate. Applicants have discovered that, in their most preferred embodiment, sodium sulfate does precipitate, Reaction 1 predominates and the formation of chlorine is suppressed, and a high yield of the desired chlorine dioxide is obtained from a reaction which goes at a relatively high rate.

It is to be understood that hydrogen chloride can be used in place of or in combination with alkali metal chloride as the source of chloride ion and as a partial fulfillment for the strong acid required.

It is preferred to use sulfuric acid in applicants' process, although hydrochloric acid and/or phosphoric acid may also be used.

In order to illustrate one of the more preferred embodiments of applicants' invention, the following example which is not to be construed as limiting applicants' invention, is presented.

EXAMPLE 1

To a single vessel generator, as hereinbefore described, were fed sodium chlorate, sodium chloride, and an aqueous solution of 50% sulfuric acid at a rate such that the average concentrations of the chlorate and chloride in the generator were 2.0 and 1.2 molar, respectively and the average normality of the sulfuric acid was 3.7. The generator was maintained at a temperature of 78 degrees centigrade at a pressure of 200 millimeters of mercury absolute. The volume of the reaction mixture was maintained at a constant level by boiling out all of the excess water added with the feed solutions. Anhydrous sodium sulfate crystallized from the solution and was removed from the system.

The reaction was run for 48 hours.

In this period a total of 4750 gms. of sodium chlorate and 4120 gms. of sodium chloride were fed to the generator. This produced a total of 2580 gms. of chlorine dioxide and 2790 gms. of chlorine. The yield of chlorine dioxide based on consumed sodium chlorate was 83.5%.

This same generator was then emptied and recharged with solution containing sodium dichromate. As before it was operated at 78° C. and 200 mm. Hg pressure. An aqueous solution of 3.2 M sodium chlorate and 3.36 M sodium chloride was fed continuously along with an aqueous solution of 50% sulfuric acid.

In one 7 hour period, after reaching steady state, the generator solution had the following average concentrations: 0.2 M $Na_2Cr_2O_7$, 3.8 $NH_2SO_4$, 0.98 M $NaClO_3$, 0.80 M NaCl. In this period a total of 545 grams sodium chlorate, 314 grams sodium chloride and 357 grams sulfuric acid were fed to the generator. This produced a total of 187 grams of chlorine dioxide and 130 grams of chlorine. The yield of chlorine dioxide based on consumed sodium chlorate was 95 percent.

When other catalysts, such as silver nitrate, manganous chloride, vanadium pentoxide, and arsenic ion are used, good results are also obtained.

EXAMPLE 2

The procedure of Example 1 was essentially followed with the exception that 1.114 grams per liter of silver nitrate were initially charged as the catalyst. Even after about 10,000 grams of chlorine dioxide had been produced (at an efficiency of about 43 gram atom percent) there was no indication of catalyst weakening. The unexpected and beneficial results of applicant process are evidenced by the fact that when no catalyst was used a gram atom efficiency of only about 33 percent was obtained. When concentrations of silver nitrate of 0.0057 gram per liter were used, essentially the same results were obtained.

EXAMPLE 3

The procedure of Example 1 was essentially followed with the exception that manganese chloride was used as the catalyst. When 2.7 grams per liter of manganese chloride were used a gram atom percent efficiency of 43 percent was obtained.

When other catalysts and/or the same catalyst at different concentrations are used, good results are also obtained. Thus, e.g., good results are obtained with silver nitrate catalyst at a concentration of 0.0001 gram of silver ion per liter. Thus, e.g., good results are obtained with a concentration of 0.001 gram of manganese ion per liter. Thus, e.g., good results are obtained with a concentration of 0.5 gram per liter of dichromate ion, arsenic ion, or vanadium pentoxide.

It is to be understood that applicants' process is not limited to being practiced in a single vessel, though, for the sake of convenience, it is preferred to so do. Applicants' process can be practiced in any system wherein alkali salt is removed but the mother liquor from said salt is retained.

While there have been described various embodiments of the present invention, the methods described are not intended to be understood as limiting the scope of the invention as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A process for the continuous generation of a mixture of chlorine dioxide, chlorine and a neutral alkali metal salt comprising
    (a) continuously feeding an alkali metal chlorate, an alkali metal chloride and a strong acid solution selected from the group consisting of sulfuric acid and a mixture of sulfuric acid and a member of the group consisting of hydrochloric and phosphoric acid, to a single vessel generator-evaporator-crystallizer in a proportion to provide a reaction solution for the generation of chlorine dioxide and chlorine;
    (b) maintaining the temperature of the reaction solution at from about 65 to 85 degrees centigrade to effect the generation of chlorine dioxide and chlorine;
    (c) maintaining the acidity of said reaction solution within the range of from 2 up to 4 normal;
    (d) maintaining the concentration of said alkali metal chlorate between about 0.5–2.5 moles per liter of solution;
    (e) maintaining the concentration of said alkali metal chloride between about 0.5 to 2.5 moles per liter of solution; while
    (f) subjecting said reaction solution to a vacuum of from about 100 to about 400 millimeters mercury absolute, to effect evaporation of water vapor;
    (g) withdrawing from said single vessel generator-evaporator-crystallizer chlorine dioxide and chlorine produced by said reaction solution in admixture with said water vapor, said water vapor being removed in an amount sufficient to maintain a substantially constant reaction solution volume, and wherein said reaction is conducted in the presence of at least one catalyst selected from the group consisting of vanadium pentoxide, silver ions, manganese ions, dichromate ions and arsenic ions;
    (h) crystallizing said neutral alkali metal salt of said strong acid within said single vessel generator-evaporator-crystallizer and withdrawing said crystals.

2. The process of claim 1 in which the molar ratio of chloride to chlorate in the reaction solution is from about 1 to about 1.3.

3. The process of claim 1 in which the reaction temperature is maintained between about 70 to about 80 degrees centigrade; the acidity of the reaction solution is maintained between 3–3.8 normal; and the reaction pressure is maintained between about 180–220 millimeters mercury, absolute.

4. The process of claim 1 in which the acid concentration is maintained between about 3.4 to about 3.8 normal.

5. The process of claim 1 in which said strong acid is sulfuric acid.

6. The process of claim 1 wherein from about 0.0001 to about 1.5 grams of silver ion per liter of reaction solution are used as the catalyst.

7. The process of claim 1 wherein from about 0.5 to about 25 grams of dichromate ion per liter of reaction solution are used as the catalyst.

8. The process of claim 1 wherein from about 0.001 to about 4 grams of manganous ion per liter of reaction solution are used as the catalyst.

References Cited

UNITED STATES PATENTS

| | | | |
|---|---|---|---|
| 1,904,190 | 4/1933 | Becher | 23—152 |
| 2,654,656 | 10/1953 | Evans | 23—152X |

(Other references on following page)

UNITED STATES PATENTS

| | | | |
|---|---|---|---|
| 2,736,636 | 2/1956 | Day et al. | 23—152 |
| 2,811,420 | 10/1957 | Pernert | 23—121X |
| 3,056,270 | 10/1962 | Grubitsch | 23—152X |
| 3,101,253 | 8/1963 | Hirschberg | 23—152 |
| 3,341,288 | 9/1967 | Partridge et al. | 23—152 |
| 3,347,628 | 10/1967 | Sepall et al. | 23—152 |
| 3,446,584 | 5/1969 | Fuller | 23—121 |

FOREIGN PATENTS

| | | | |
|---|---|---|---|
| 1,443,754 | 5/1966 | France | 23—152 |
| 1,443,755 | 5/1966 | France | 23—152 |
| 1,260,447 | 2/1968 | Germany | 23—152 |

EDWARD STERN, Primary Examiner

U.S. Cl. X.R.

23—152, 219; 252—187